United States Patent [19]
Rubin

[11] Patent Number: 5,208,600
[45] Date of Patent: May 4, 1993

[54] GLIDE SLOPE SURVEILLANCE SENSOR

[76] Inventor: William L. Rubin, 166-47 16th Ave., Whitestone, N.Y. 11357

[21] Appl. No.: 844,767

[22] Filed: Mar. 2, 1992

[51] Int. Cl.⁵ .............................................. G01S 13/95
[52] U.S. Cl. ...................................................... 342/26
[58] Field of Search ......................................... 342/26

[56] References Cited
U.S. PATENT DOCUMENTS

| Re. 33,152 | 1/1990 | Atlas ..................................... 342/26 |
| 4,103,300 | 7/1978 | Gendreu et al. .................. 342/26 X |
| 4,351,188 | 9/1982 | Fukushima et al. ............. 342/26 X |

Primary Examiner—T. H. Tubbesing
Attorney, Agent, or Firm—Seymour Levine

[57] ABSTRACT

A surveillance sensor for detecting and monitoring aerodynamic conditions in a vicinity of an aircraft landing glide slope utilizes a radar transmitter to illuminate the glide slope. Radar reflections from aircraft induced vortices, clear air turbulence, and glide slope cross winds are received by a monopulse radar system wherein a sum beam doppler spectrum and a difference beam doppler spectrum for the radar returns is determined. The sum and difference beams doppler spectra are processed to determine the aerodynamic conditions in the glide slope vicinity. These aerodynamic conditions are assessed to determine whether aerodynamic hazardous conditions exist in the glide slope region.

17 Claims, 5 Drawing Sheets

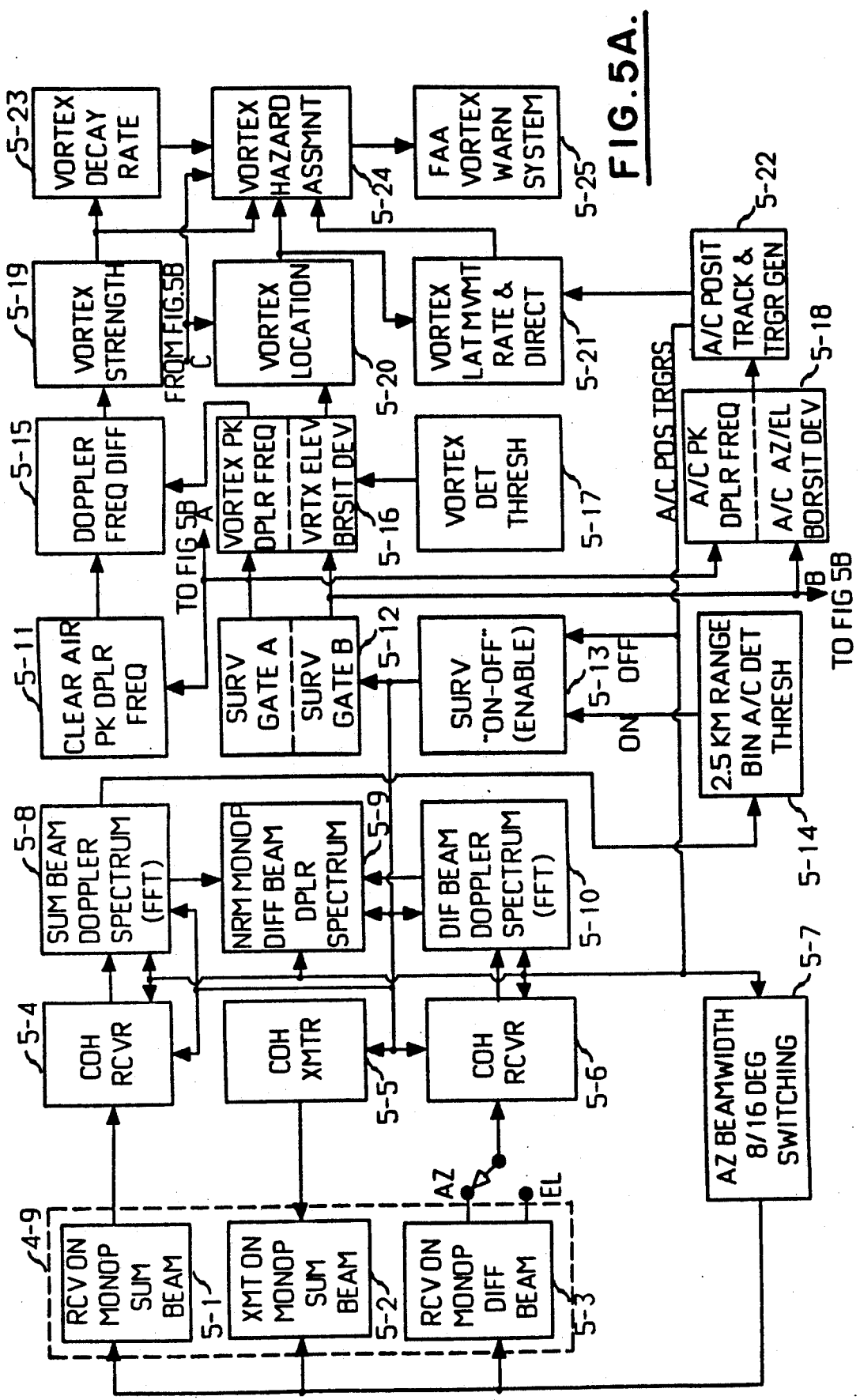

GLIDE SLOPE SURVEILLANCE SENSOR

BACKGROUND OF THE INVENTION

1. Field of the Invention

The present invention relates to the field of aircraft safety, and more particularly to the detection and location of clear air wind shear conditions, clear air turbulence, cross wind velocity, and aircraft generated vortices.

2. Description of the Prior Art

Aircraft generated vortices, clear air turbulence, cross winds, and (horizontal) wind shear all present severe hazards to aircraft which inadvertently encounter any of these conditions in the approach (or departure) glide slope corridors. Aircraft can be subjected to movements which result in a dangerous loss of altitude, and possibly structural failure. Such encounters are most dangerous in the terminal area glide slopes where recovery from an upset may not be possible due to the aircraft altitude.

Although the phenomenon of aircraft wake vortices has been known since the beginnings of powered flight, it is only since 1970 that the danger of aircraft encounters with wake vortices has become apparent. All aircraft generate vortices as a result of generating lift, including helicopters. Landing aircraft separations are dictated by the time for vortices to decay. Heavier aircraft generate stronger vortices than light aircraft and require larger separations behind them. Thus aircraft vortices impact both airport capacity and safety.

Since a cross wind can blow vortices out of the glide slope, knowledge of cross wind velocity by direct measurement in each range bin along the glide slope can result in reduced spacings between landing aircraft, thereby increasing the number of landings per hour at busy airports. Previous systems which have extrapolated cross wind velocity from measurements elsewhere have proved to be unreliable and hazardous to landing aircraft.

A. CLEAR AIR WIND SHEAR AND TURBULENCE DETECTION

One method of the prior art for detecting surface clear air wind shear conditions employs ground observations of wind direction and magnitude using mechanical wind sensors at a plurality of locations about an airport. Mechanical wind sensors do not measure wind conditions remotely. Consequently, this system can only sense wind shear conditions at sensor locations. Wind shear is a highly localized phenomenon. Conditions may exist which give rise to wind shear conditions at a location whereat a mechanical wind detector is not positioned. Though such a wind detector may be positioned but a short distance from the hazardous location a detection of the hazardous condition would not be reported. Mechanical wind detection systems have thus proven to be inadequate. Serious accidents have occurred at airports whereat such systems have been employed due to the untimely or missed detection of a wind shear condition.

A second method of the prior art utilizes horizontally directed ground based doppler radar. Wind shear and turbulence can be estimated, with this system, from the doppler spectrum of radar echoes received from entrained moisture droplets, insects and/or dust, if present, which act as indicators of the bulk behavior of the air. In clear air, however, such radars lack sufficient power for the detection of wind shear or turbulence.

Clear air wind shear and turbulence also cause small inhomogeneities in the air's index of refraction which have been detected by sensitive, high power radars designed to investigate atmospheric conditions. These radars detect very small backscatter signals by integrating the received signals for several minutes. Since the radar beam is directed aloft ground clutter is absent from the radar returns. Should such a radar system be horizontally directed the presence of ground clutter in the radar returns mask the atmospheric returns and make reliable wind shear and turbulence detection virtually impossible.

Other methods in the prior art for detecting wind shear and turbulence utilize on-board apparatus to determine the ground speed of the aircraft and compare it to the air speed of the aircraft. The difference in speeds coupled with information provided by the aircraft inertial accelerometers provide an indication of wind conditions about the aircraft. Such airborne generated information is not presently communicated to ground controllers in real time and is usually reported by pilots after they have passed through the hazardous region.

B. DETECTION OF AIRCRAFT VORTICES

Vortices are generated by winged aircraft of all sizes as a natural consequence of wing lift. Part of the power of an aircraft is lost at once to friction. However, a good part of it, the part corresponding to induced drag, concentrates into a pair of counter-rotating vortices which form a long wake behind the aircraft that lasts for several minutes. Newly formed vortices in a glide slope are particularly dangerous to following aircraft.

The basic function of a wake vortex sensor is to detect, track, and measure the strength of a wake vortex. Each of these functions successively involves a higher order of complexity. Sensors exist which can detect and track a wake vortex but cannot measure its strength. Since the most important vortex parameters to be measured are location and strength the systems of the prior art do not provide the necessary capabilities.

a. Mechanical Techniques

Mechanical sensors, for example wind velocity sensors and pressure sensors, provide in situ measurements. The effectiveness of these sensors, however, is height dependent. If the sensors are positioned on mounts of sufficient height to probe the center of the vortex, they pose a hazard to to flying aircraft and cannot be used in an operational environment. If the height is reduced to eliminate this hazard the sensors measure only the peripheral region of the vortex and cannot verify the location and persistence of the vortex core.

In situ wind sensors provide a direct measurement of the vortex-velocity field at the location of the wind sensor. Some of the earliest and most detailed vortex measurements were made with instrumented towers which were tall enough to measure the complete flow field of a vortex as it drifts through the tower. Although tall instrumented towers cannot be installed near airport runways, anemometers located near the ground have successfully detected and tracked vortices in runway-approach regions.

A system called the Ground Wind Vortex Sensing System (GWVSS) has produced the bulk of the currently available data on wake vortex transport in the airport environment. The GWVSS consists of an array of single-axis anemometers installed on a baseline perpendicular to the aircraft path. Since the wake vortices induce winds near the ground which are perpendicular to the flight path, the anemometers are oriented to respond only to the perpendicular component of the wind (crosswind).

The two wake vortices generated by a flying aircraft rotate in opposite directions and are therefore readily distinguishable. The success of the GWVSS is the result of the normal behavior of these wake vortices near the ground. After creation, the vortices descend toward the ground at a rate of 1 to 2 meters per second. According to classical theory, when the vortices approach the ground they begin to separate and eventually reach an altitude of half their initial spacing and a separation rate of twice their initial descent rate. Thus, the vortex motion produces conditions needed to give good GWVSS signatures; namely, low altitudes and large lateral separations. The theory also predicts a maximum GWVSS crosswind of four times the initial descent rate, i.e., 4 to 8 m/s.

Although theory predicts otherwise, vortices often rise. Hence, a basic limitation of the GWVSS is that a decrease or disappearance of a vortex signal can be caused by vortex decay or by an altitude increase which could even increase the hazard to a following aircraft. Pressure sensors measure ground level pressure and velocity signatures of wake vortices. This approach has many limitations including an inability to distinguish which vortex is being sensed.

b. Acoustic Sensors

A massive effort has been directed at the development of active and passive acoustic sensors for remote sensing of aircraft wake vortices. They all suffer from sensitivity to ambient noise. The major noise sources which limit the performance of acoustic sensors in the airport environment are aircraft operations and meteorological effects such as rain hitting the (acoustic) antenna and wind whistling around the antenna. No acoustic sensor is currently an all-weather system.

c. Optical Techniques

Optical techniques have the general advantages of high resolution and long range. They are, however, degraded by conditions of low visibility, though infrared sensors are less affected than those using visible light.

Wake vortices can become visible if they contain a sufficient density of light scattering particles. At high altitudes water vapor condenses in the wake vortices and is frequently seen as contrails. Within the atmospheric boundary layer, vortices are rarely optically visible.

A number of proposals have been made to detect wake vortices by passive infrared scanners. The technique is based on the excess radiation from the aircraft wake which contains heat, $H_2O$, and $CO_2$ from the engine exhaust. The infrared signature of the wake is likely to give general vortex locations, but it is uncertain whether it can indicate vortex decay.

The Scanning Laser Doppler Vortex Sensor (SLDVS) operates in the far infrared transverse to the glide slope. The SLDVS operates in the cw back scatter mode, making use of naturally occurring aerosols as scattering targets. The Doppler shifts in the return signal measures the vortex rotation along the laser beam line-of-sight and provides a doppler shift of 1.9 MHz for a velocity of 10 meters per second.

Spatial resolution is achieved by focusing the cw laser beam at the desired range. The maximum useful range with this approach is roughly 500 meters. A pulsed laser to achieve range resolution is not utilized because a single pulse velocity resolution at 10.6 microns, for a specific desired spatial resolution is a factor of a 100 worse than a 3 kHz doppler acoustic sensor. Moreover, many pulses cannot be integrated because the coherence of the scattered signal is limited by diffusion of the aerosol scatterers.

d. Electromagnetic Techniques

The radar cross sections of wake vortices are very small. Vortex rotation has been detected by an experimental S-band FM-CW doppler radar that was oriented perpendicularly to the vortex wake. The performance of such radars has been marginal at best and a multiplicity of radars would be required to monitor the entire glide slope. Doppler detection of the small wake echo in the direction of the glide slope is virtually impossible due to the spectral proximity of ground clutter return.

C. RADAR/ACOUSTIC DETECTION

Radar/acoustic detection has been used to obtain a vertical temperature profile of the atmosphere. This is accomplished with a vertically directed "wind profiler" radar and a vertically directed acoustic radiator which acoustically excites the column of air illuminated by the radar beam.

The radar alternately measures (a) the vertical wind velocity as a function of height and (b) the velocity of vertically directed sound waves. Since the speed of sound has a known relation to atmospheric temperature, both measurements permit height variations in the speed of sound due only to temperature changes to be deduced, from which the vertical temperature profile of the atmosphere is determined.

BRIEF DESCRIPTION OF THE DRAWINGS

FIGS. 5A and 5B are block diagrams of a preferred embodiment of the invention.

SUMMARY OF THE INVENTION

Figure 1:
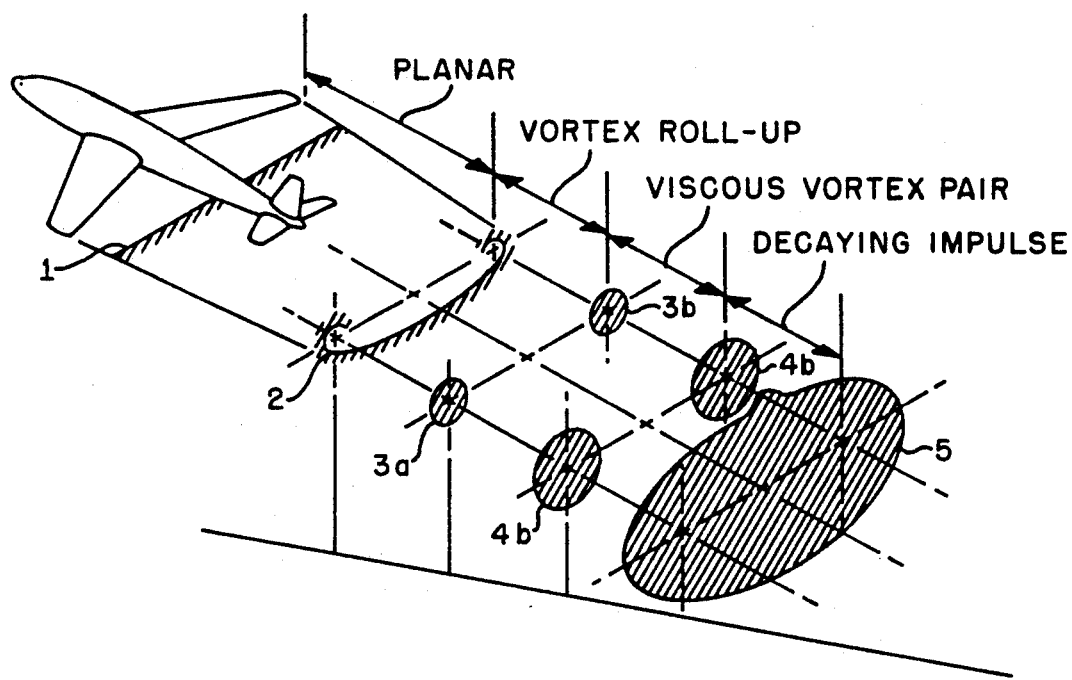
FIG. 1 is an illustration useful for explaining vortex pair formation and decay.

It is an objective of the present invention to detect and measure the magnitude and location of clear air radial wind shear, turbulence and cross wind velocity within a 90-meter wide glide slope corridor.

It is a second object of the invention to detect and locate aircraft generated vortices in the glide slope corridor and estimate the hazardous condition magnitude posed for following aircraft.

These objectives are realized by locating a 2-axis monopulse antenna of a radar system at or near the runway threshold (beginning of the runway . The monopulse antenna is aimed up the glide slope. Backscattered signals within the approach corridor from range bins in front of and behind landing aircraft and from the range bin containing the landing aircraft are coupled to monopulse sum and difference receivers wherein they are amplified and coherently detected prior to calculating sum and difference doppler voltage spectra and establishing a normalized monopulse difference doppler voltage spectrum The desired information concerning clear air wind shear, turbulence, cross wind velocity and vortices are derived from these quantities.

The radar detects so-called "Bragg" radar echoes returned from acoustically excited air within the glide slope. "Bragg" backscatter occurs when periodic fluctuations in the index of refraction are imposed upon the atmosphere by an acoustic wave whose wavelength is half the radar wavelength.

In the principal mode of operation acoustic excitation is generated by broadband acoustic noise emanating from aircraft in the glide slope. An auxiliary mode may be implemented in which the acoustic excitation is provided by an acoustic radiator, colocated with the radar, to survey the glide slope when no aircraft are present in the glide slope. Auxiliary mode measurements may be repeated as often as desired.

Because "Bragg" echoes have a large doppler shift corresponding to the speed of sound, they can be detected in the presence of ground clutter whose spectral energy is typically clustered around zero velocity. The doppler shifted "Bragg" echoes are processed to determine clear air radial wind shear, clear air turbulence and cross wind velocity within the glide slope. The processing also permits aircraft generated vortices to be detected and located in the glide slope.

The radar utilizes a 2-axis monopulse antenna configuration. Pulsed radar signals are radiated up the glide slope corridor on the monopulse antenna sum beam. An optional configuration, which enhances the accuracy for measuring cross wind velocity, may use two additional antennas symmetrically displaced on either side of the monopulse antenna.

The monopulse antenna may be alternately switched for predetermined intervals to provide either azimuth or elevation monopulse information modes. Signals received from the sum beam and the difference beam for each mode are coupled to two receivers where they are amplified and coherently detected.

A Fast Fourier Transform (FFT) is performed on the output of each receiver for each range bin in the approach corridor. The difference beam doppler spectrum is divided by the sum beam doppler spectrum, doppler bin by doppler bin, to obtain a normalized monopulse difference beam doppler spectrum. Sum beam doppler spectrum in range bins receiving vortex backscatter will have two doppler peaks. The doppler spectrum in the range bin receiving the aircraft echo will have just one peak.

In the monopulse sum beam doppler spectrum for range bins containing two peaks, the lower amplitude peak signal identifies the vortex "Bragg" frequency and the higher amplitude peak doppler signal identifies the clear air "Bragg" frequency. The normalized elevation monopulse difference beam spectral amplitude associated with the lower amplitude peak signal is a quantitative measure of a vortex pair angle deviation from the monopulse antenna elevation boresight. Azimuth monopulse measurements on vortex pairs are generally not feasible due to their horizontal spacing and possibly unequal reflected signal amplitudes. The difference between the vortex and clear air "Bragg" frequencies in each range bin permits the determination of temperature difference between them. This temperature difference is a measure of vortex rotational velocity or strength. The temporal and spatial rates at which vortex "Bragg" frequency declines relative to that for surrounding air is a measure of vortex decay rate.

The measured "Bragg" doppler frequency and doppler spectral width for clear air return in each range bin permits the determination of radial wind shear and turbulence as a function of range.

Azimuth arrival angle rate of change of the clear air "Bragg" signal received by the monopulse antenna is a measure of cross wind velocity This is the result of a cross range shift of the acoustic wavefront by the cross wind.

Since the azimuth angle of arrival is a function of range for a given cross range shift, it is necessary to know the range bin in which the monopulse measurement is being made. Increased cross wind estimation accuracy can be achieved by adding two receive antennas on either side of the monopulse antenna operating as a two element interferometer to measure the rate of change of clear air backscatter azimuth direction.

The peak doppler frequency in the sum beam doppler spectrum for the range bin containing the aircraft is directly related to the radial velocity of the aircraft. The magnitude of the normalized monopulse difference beam spectrum associated with this doppler frequency is a quantitative measure of aircraft angle deviation from the monopulse antenna boresight (in azimuth or elevation depending on the mode in which the measurement was made).

When aircraft generated acoustic noise is not available to excite the glide slope, an acoustic radiator aimed up the glide slope that is colocated with the radar transmit antenna can provide alternate excitation of the glide slope and thereby permit the measurement of clear air wind shear and turbulence, but not cross wind velocity, in a manner similar to that previously described for an aircraft acoustically excited glide slope.

In addition, the auxiliary acoustic radiator permits measurements of the temperature of vortices generated by the aircraft which has just landed to be extended over a longer time period to provide a more accurate measurement of the temporal decay rate of the newly generated vortices.

It will become apparent from the description of the Preferred Embodiments that the invention:

(1) enhances the detectability of clear air motion and vortices in arrival and departure glide slopes by amplifying and processing "Bragg" radar reflections in a glide slope that is acoustically excited by acoustic noise emanating from landing and departing aircraft;

(2) enhances the detectability of clear air and vortex "Bragg" echoes in clutter by virtue of the large doppler difference between "Bragg" backscatter and ground clutter;

(3) locates vortices and aircraft in azimuth and elevation in each range bin from monopulse measurements on vortex and clear air "Bragg" backscatter as well as conventional aircraft echoes, respectively;

(4) provides an estimate of vortex rotational velocity in each range bin and its rate of decay by measuring vortex temperature and rate of decline of vortex temperature as a function of time based on vortex "Bragg" frequency measurements;

(5) provides a spatial estimate of the rate of decay of vortex rotational velocity from the rate at which vortex "Bragg" frequency decreases with increasing range;

(6) estimates radial wind shear from differences in the clear air "Bragg" frequency between adjacent range bins along the glide slope;

(7) estimates atmospheric turbulence from the increase in spectral spread about the clear air "Bragg" frequency in each range bin;

(8) estimates cross wind velocity in each range bin from monopulse measurements at the clear air "Bragg" frequency, from which the transverse displacement of the acoustic wave by a cross wind is computed as a function of time;

(9) provides enhanced cross wind velocity accuracy by employing two auxiliary monopulse receiving antennas, displaced a greater distance than the first pair, on either side of the monopulse antennas;

(10) estimates wind shear and turbulence in the glide slope when aircraft are not present by means of an auxiliary acoustic radiator colocated with the radar monopulse antenna that acoustically excites the glide slope;

(11) provides extended measurements of the temperature of vortices generated by an aircraft that has just landed to provide a more accurate projection of its vortex decay rate by means of an auxiliary acoustic radiator colocated with the radar monopulse antenna that acoustically excites the glide slope.

DESCRIPTION OF THE PREFERRED EMBODIMENTS

The velocity of sound in air varies with temperature. At 0° C., the velocity of sound is 331.4 meters per second and increases by 0.6 meters per second for each degree rise. As previously stated, "Bragg" backscatter of a radar signal occurs when periodic fluctuations in the index of refraction are imposed upon the atmosphere by an acoustic wave having a "Bragg" wavelength which is one half the radar wavelength. Since radar doppler shift varies with sound velocity, the received radar signal doppler frequency for "Bragg" backscatter will vary with air temperature. As will be shown, the acoustic frequency corresponding to the "Bragg" wavelength for a particular sound velocity is equal to the received radar signal doppler frequency. For convenience this frequency will be referred to as the "Bragg" frequency.

The "Bragg" frequency for acoustic waves within a vortex will differ from the "Bragg" frequency of acoustic waves in surrounding air as a result of a higher temperature within the vortices. The higher vortex temperature is caused by the entrapment of engine exhaust within the vortices which form immediately behind the aircraft. Vortex temperature rises of the order of 5°–20° C. relative to the surrounding air have been predicted by NASA researchers of vortex phenomena.

As vortex rotation slows, the cross section of the vortices increase from their starting diameters of 0.02b–0.04b, where b is the wingspread of the vortex generating aircraft, to approximately 0.2b just before decay. This essentially adiabatic expansion of cross section area by a factor of 25–100 will cause vortex temperature to decline. According to some reports vortex temperature can drop in this process to 5°–10° C. below surrounding air ambient prior to vortex disappearance.

Vortex "Bragg" frequency is directly related to vortex temperature which declines as the vortex slows. Consequently, the measured vortex backscatter doppler frequency relative to that for surrounding air is an indication of vortex rotational velocity slowing. As will be explained subsequently, elevation radar monopulse processing of the vortex return in each range bin, performed in accordance with the invention, locates vortices in elevation with respect to a radar boresight in the glide slope corridor as a function of range. Since vortices form directly behind an aircraft, knowledge of aircraft position in the radar beam provides the initial location of newly formed vortices. From measured cross wind velocity in each range bin, subsequent locations in azimuth can be computed.

Radar reflections are enhanced as a result of the "Bragg" effect and, under favorable circumstances, the quasi-spherical shape of the propagating acoustic wavefronts will focus radar reflections back towards the radar transmitting antenna. The most favorable circumstance occurs when the radar and the acoustic source are co-located. In this case the backscatter is focussed onto a spot on the transmitting antenna, greatly enhancing the received echo. When the acoustic source is an aircraft displaced from the radar, the "Bragg" signal strength received by the radar is reduced. As will explained subsequently, the received signal magnitude may be estimated using geometric optics.

There are three main effects limiting "Bragg" backscatter detection range: (1) acoustic attenuation by the air, (2) crosswind displacement of acoustic wavefronts, and (3) turbulence disrupting the transverse coherence of the acoustic wavefront.

Acoustic attenuation is not important at about 100 Hz, but increases rapidly with frequency. For frequencies around 1 kHz, typical values are about 6–8 db/km and at 2 kHz the attenuation is about 16 db/km. The preferred embodiments, for illustrative purposes, utilize a radar frequency of 915 MHz, which corresponds to a "Bragg" acoustic frequency of 2.02 kHz at 0° C.

Since a cross wind in the glide slope displaces vortices as much as it displaces an acoustic wave, the absence of vortex "Bragg" return in the approach corridor, due to a strong cross wind, is unambiguous. Before the acoustic wave is shifted out of the corridor by the cross wind, the transverse displacement of the acoustic wave may be measured as a function of time, thus permitting cross wind velocity to be determined.

Turbulence disturbs the transverse coherence of the acoustic wave. "Bragg" backscatter geometry, however, doesn't change substantially, even for strong turbulence. This can be explained physically by noting that the acoustic wave front can be decomposed into two parts, an unperturbed spherical wavefront and a random wavefront caused by atmospheric turbulence. The incident radar wave will be scattered by the random part producing a small background scatter level over a large solid angle. The backscatter geometry will be the same for the unperturbed spherical acoustic wave except for reduced amplitude. Local atmospheric velocity fluctuations due to turbulence will increase the doppler spectral width of "Bragg" backscatter, which may be measured to indicate the magnitude of the turbulence present.

An acoustic wave within the radar beam travels away from or towards the radar at the speed of sound, depending upon whether a range bin is in front of or behind the aircraft. Hence, a "Bragg" backscatter will have positive or negative doppler shift with a magnitude which corresponds to the velocity of sound. This large doppler shift associated with the "Bragg" return facilitates the discrimination from ground clutter returns.

Because the velocity of sound in the vortices and the surrounding clear air are initially unknown, acoustic excitation of the glide slope must encompass a band of "Bragg" frequencies in the vicinity of 2 kHz which corresponds to the velocity of sound at 0° C. The spectrum of the aircraft noise easily satisfies this requirement.

The stages in a vortex life span are shown in FIG. 1. A wake vortex originates in the vorticity shed from the generating wing of the aircraft. In the planar sheet phase, wing vorticity is shed in an approximately planar sheet 1 with a width approximately equal to the span of the generating wings. Thereafter, the sheet commences to form a self-induced scroll-like shape 2 behind the aircraft, during a phase known as vortex roll-up. Before the aircraft has moved 10-20 wing spans the roll-up process is completed, trapping practically all of the aircraft hot engine exhaust in the vortices, concentrating wing vorticity in two approximately circular cores referred to as the viscous vortex pair 3a,3b. Various interactions sometimes occur in these cores after formation, creating instabilities which cause the wake to break up rapidly. If catastrophic instabilities do not occur, the viscous vortex pair phase commences during which the cores expand under the influence of both atmospheric and aircraft-induced turbulence, as indicated by the expanded cores 4a,4b. After the viscous vortex pair phase, the final regular decay process, known as the decaying impulse stage, takes place. During this phase, the cores continue to expand to eventually merge and fill an approximately elliptical region 5 of vorticity.

Figure 2:
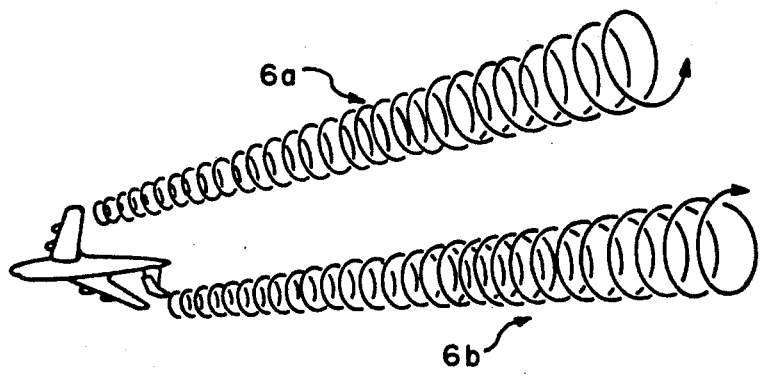
FIG. 2 is an illustration of a viscous vortex-pair wake.

Most of a vortex life span is spent in the viscous vortex-pair stage. FIG. 2 shows a viscous vortex-pair wake 6a,6b behind an aircraft with progressively increasing vortex diameters reflecting vortex aging. The preferred embodiments, to be described, detect, locate, and track vortices which remain in the glide slope after a vortex generating aircraft has passed.

Figure 3:
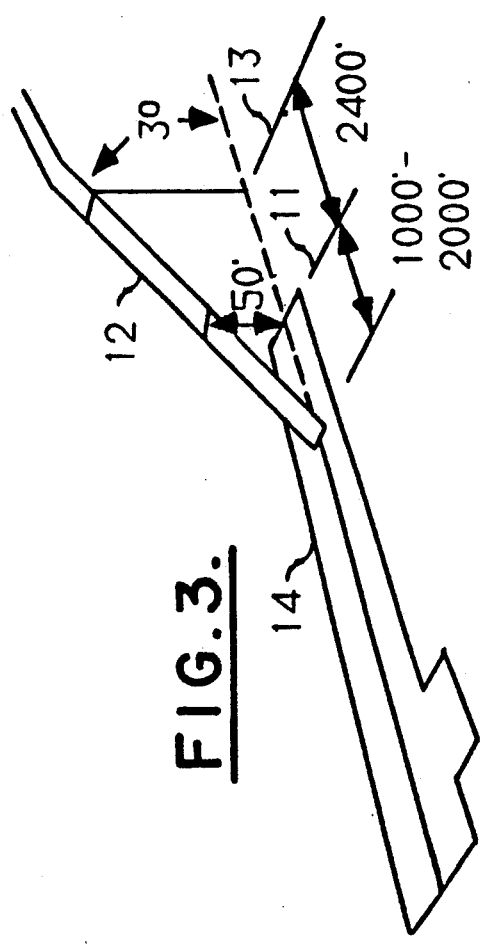
FIG. 3 is an illustration of an aircraft runway approach

FIG. 3 shows a standard aircraft landing approach. In accordance with the invention, a monopulse radar antenna is located at the threshold. A landing aircraft enters the glide slope 12 at the outer marker, not shown, and proceeds down the glide path 12 past the middle marker 13 and the threshold 11 for a landing on the runway 14. The aircraft is nominally 50 feet above ground level as it passes over the threshold. The standard landing glide slope angle is 3°.

Figure 4:
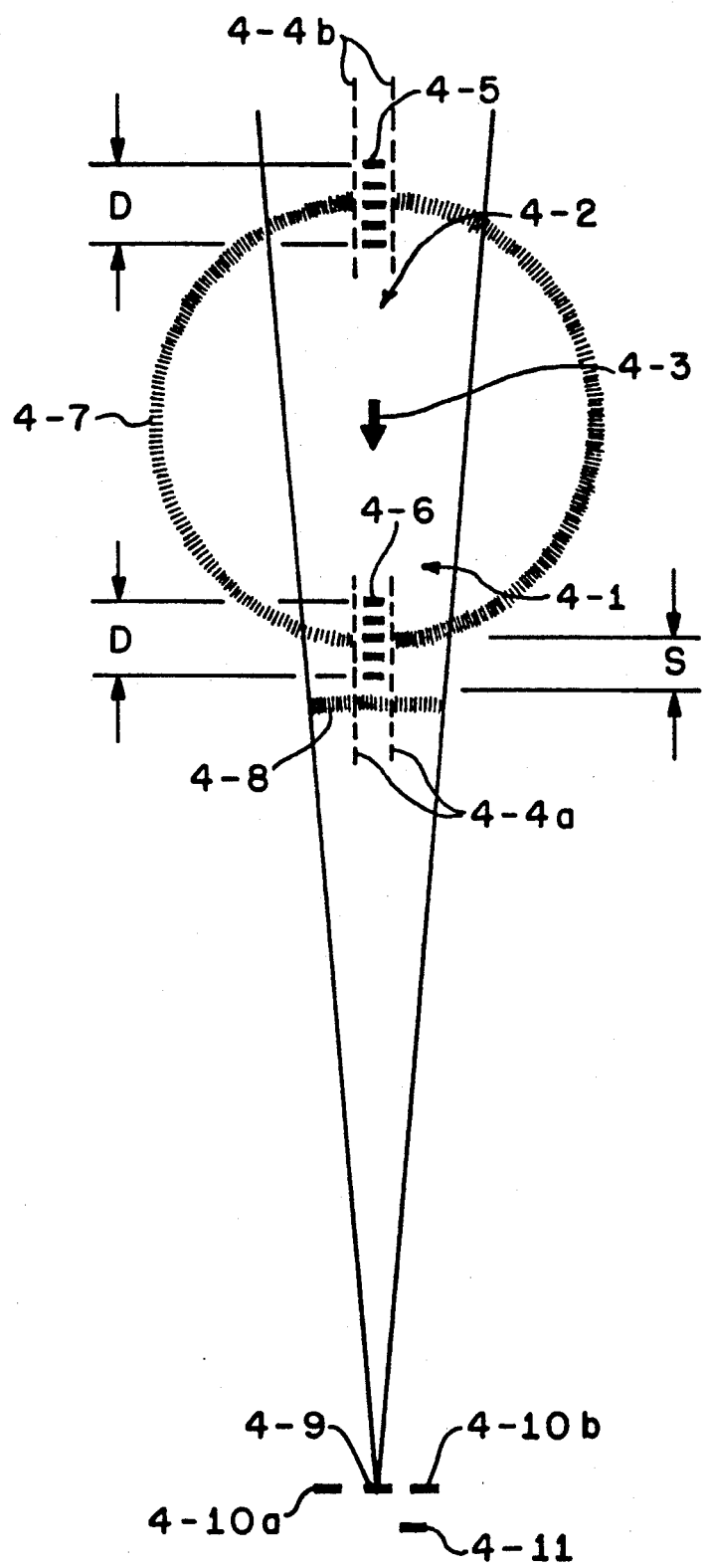
FIG. 4 illustrates acoustic wave radar backscatter geometry and the generating mechanism thereof. This figure is useful for explaining the operation of a preferred embodiment of the invention.

Two backscatter geometries, shown in FIG. 4, are detected by the monopulse radar. The first 4-1, "Bragg" reflection from vortices generated by previous aircraft and surrounding clear air in front of an incoming aircraft 4-3 and the second 4-2, "Bragg" reflection from vortices generated by the incoming aircraft and surrounding clear air behind the incoming aircraft.

As illustrated in FIG. 4, vortices 4-4a and 4-4b intercept a very small portion of the radar beam at all ranges. The "Bragg" reflected signal amplitude from a vortex can be computed by recognizing that a vortex consists of a relatively narrow cylinder of acoustically excited air having a temperature different from surrounding air. Such a cylinder constitutes an end-fire array, as indicated at 4-5 and 4-6 with elements separated by one half the radar wavelength $\lambda_{RF}$ and a spatial length equal to radar range bin width D. The end-fire array is aimed back towards the source of the incident radar wave with a beamwidth equal to:

$$BW = 2(2\lambda_{RF}/D)^{\frac{1}{2}}$$

When the acoustic wavefront 4-7 and a radar wavefront 4-8, provided by a radar system monitoring the glide slope, are slightly skewed due to a crosswind, vortex return will still be received by the radar monopulse antenna as long as they remain within the end-fire array beamwidth. There may, however, be a slight change in Bragg frequency due to the slightly different directions of the acoustic and electromagnetic wavefronts.

Still referring to FIG. 4, a 2-axis monopulse radar antenna 4-9 may be located at the threshold to illuminate the glide slope and receive "Bragg" reflections. The monopulse antenna may be positioned on the glide slope center line while an optional monopulse auxiliary receive antenna with elements 4-10a and 4-10b positioned on either side of the monopulse antenna may also be utilized. Both the monopulse antenna and the monopulse auxiliary receive antenna point approximately 5° up the glide slope relative to the ground.

Because of their proximity to the glide slope, the monopulse antenna 4-9 and auxiliary receive antenna 4-10a, 4-10b must be constructed of frangible materials or held in place with easily broken couples. Such a requirement may be satisfied by a planar array which may be constructed to provide monopulse antennas having independent control of the sum and difference beam illumination functions, thereby permitting low antenna sidelobes to minimize clutter. Each of the planar array antennas may be configured to provide a 4° elevation beamwidth and selectable azimuth beamwidths of 8° or 16°.

A switch, not shown, may be designed into the monopulse array feed networks to provide either azimuth or elevation monopulse difference beam outputs. It should be apparent that the azimuth monopulse antenna configuration permits the determination of the azimuthal location of landing aircraft, while an elevation monopulse configuration permits the determination of the elevation location of vortices and aircraft. Antenna 4-9 is a conventional monopulse antenna which provides unambiguous azimuth position information of a vortex pair. This unambiguous information, however, may not provide sufficient accuracy to determine cross wind velocity in each range bin. The auxiliary antenna elements 4-10a and 4-10b may be positioned with a base line therebetween which provides the desired accuracy, albeit ambiguous. Combining antennas 4-9 and 4-10a,4-10b provides unambiguous azimuth information with the desired accuracy.

As will be discussed, a one microsecond transmitted pulse, with an appropriate range gate, establishes a vortex end-fire array 150 meters long with a beamwidth of 7.58° at 915 MHz. In selecting a transmitter pulse width consideration must be given to pulse amplitude droop caused by atmospheric attenuation. Acoustic signals in the vicinity of 2 KHz experience an atmospheric attenuation of about 16 db/km. The following table compares the pulse amplitude droop of a "Bragg" reflected radar signal for three pulse widths, having corresponding range bin widths D, for a 2 KHz acoustic signal:

| Pulse Width | D | Pulse Amplitude Droop |
|---|---|---|
| .67 us | 100 m | 1.6 dB |
| 1.0 | 150 | 2.4 |

| Pulse Width | D | Pulse Amplitude Droop |
|---|---|---|
| 1.33 | 200 | 3.2 |

While matched filter design can compensate for pulse amplitude droop, engineering judgment suggests that amplitude attenuation across the received pulse be no greater than 3 dB. On this basis a 1 microsecond pulse (150 meter range bin) is selected. It will be shown that this selection leads to acceptable radar temperature measurement accuracy which depends on range bin width.

When the glide slope is clear of aircraft, the radar pulse repetition frequency PRF) may be chosen as 2048 pulses per second and the monopulse antennas configured for azimuth monopulse reception with the azimuth beamwidth for all three antennas to be 8°. When an aircraft is detected at a range of 2.5 km, it is tracked until it passes the threshold. The PRF is increased to 40,000 pulses per second after such detection and remains at this rate for 10 seconds beyond the time the aircraft has passed over the threshold, after which the acoustic excitation ceases due to the plane's landing. The PRF then returns to 2048 pulses per second. The low PRF corresponds to an unambiguous range of approximately 36 km and the high PRF to 3.75 km. Once an aircraft is in track, the high PRF poses no range ambiguity problem.

Returns in the range interval between 2.5 km and 175 meters are processed at the high PRF for clear air wind shear, turbulence, cross wind velocity and vortices. (The receiver is gated off for the first 175 meters to protect it from the 1 microsecond transmission.) Azimuth beamwidth for all 3 monopulse beams changes to 16° when an approaching aircraft reaches 1 km from the radar and changes back to 8° after the plane has landed.

Output S/N for vortices is significantly smaller than that for clear air or aircraft returns. Although glide slope surveillance is activated when an aircraft is 2.5 km from the radar, radar parameters in the preferred embodiment are based on acceptable vortex detection and location performance for the first 2 km from the radar, which is a stated FAA requirement. With these parameters the sensor provides satisfactory performance for measuring clear air wind shear, turbulence, and cross wind velocity over the entire 2.5 km range.

Vortex diameters are typically of the order of 1 meter when newly formed and grow 5 to 10 times before disappearing. Consequently, the radar system must be capable of detecting a vortex with a diameter as small as 1 meter.

It is convenient to reference S/N at other ranges to sensor performance for detecting and locating vortices 1 km from the radar when the aircraft is 2 km from the radar. Let $(S/N)_0$ denote the signal-to-noise ratio for backscatter from a pair of vortices at $R_0=1$ km from the radar when the incoming aircraft is 2 km from the radar. The S/N for vortices at other ranges R can be simply computed relative to that at $R_0$ as shown in Table 1.

TABLE I

| RANGE R | RADAR S/N GAIN/LOSS | ACOUSTIC LEVEL GAIN/LOSS | COMBINED S/N GAIN/LOSS |
|---|---|---|---|
| 250 m | +24 db | −20.1 db | 3.9 db |
| 500 | +12 | −15.6 | −3.6 |
| 1000 | 0 | 0 | 0 |
| 1500 | −7 | +5.5 | −1.5 |
| 2000 | −12 | +16.0 | +4.0 |

The second column in Table 1 is based on the signal strength of the radar return varying as $R^{-4}$. The third column shows the acoustic excitation power level for each range referenced to the acoustic level at Ro. It will be shown that "Bragg" backscatter amplitude varies directly with acoustic excitation level. The fourth column combines RF and acoustic gain/loss factors into a single relative performance factor.

The acoustic level at range R is a function of aircraft generated noise level, atmospheric attenuation rate and the distance travelled by the acoustic waves from the aircraft to R. For "Bragg" frequencies around 2 kHz, atmospheric attenuation is 16 db/km as mentioned earlier. The sound level for each range reflects the distance travelled by the acoustic signal to range R assuming a landing aircraft velocity of 80 m/s.

Table 1 shows that vortex S/N varies only 3–4 db from $(S/N)_0$ over the entire surveillance range for an aircraft 2 km from the radar.

Vortex S/N relative to $(S/N)_0$ when the aircraft has reached 1500 meters from the radar is shown in Table 2. It is evident from Table 2 that S/N for vortices in front of the aircraft increases rapidly as it approaches the radar.

TABLE 2

| RANGE R | RADAR S/N GAIN/LOSS | ACOUSTIC LEVEL GAIN/LOSS | COMBINED S/N GAIN/LOSS |
|---|---|---|---|
| 250 m | +24 db | −10.4 db | 13.6 db |
| 500 | +12 | 0 | +12.0 |
| 1000 | 0 | +5.5 | +5.5 |
| 1500 | −7 | +16.0 | +9.0 |

$(S/N)_0$ may be determined as outlined below. The radar "Bragg" reflection coefficient $\Gamma_B$ is given by:

$$\Gamma_B = \sqrt{2\pi} D \Delta n / \lambda_{RF}$$

where D is the radar range bin width in meters, $\lambda_{RF}$ is the radar wavelength and $\Delta n$ is the rms refractive index of modulation imparted by the acoustic excitation. The index of refraction n of air at microwave frequencies is closely given by $$n = 1 + (77.6 \, p/T) \times 10^{-6}$$

where T is the absolute temperature in degrees Kelvin and p is the barometric pressure in millibars.

Sound pressure is measured in dynes/cm². The reference sound pressure level of 0 dB is defined as 0.0002 dynes/cm² ($10^{-16}$ watts/cm²). Hence any other sound pressure P can be written as:

$$P = 0.0002 \times 10^{S/20} \text{ dynes/cm2}$$

where S is dB above 0.0002 dynes/cm². Since 1 millibar is approximately equal to 1000 dynes/cm², sound pressure in millibars becomes:

$$P = 2 \times 10^{-7} \times 10^{S/20} \text{ millibars}$$

The rms refractive index of modulation is $$\Delta n = (77.6 \times 10^{-6}/T) \times (2 \times 10^{-7} \times 10^{S/20})$$

For $T = 273°$ K. ($0°$ C.):

$$\Delta n = 5.685 \times 10^{-14} \times 10^{S/20}$$

With the above, the radar reflection coefficient r is given by:

$$\Gamma_B = \sqrt{2}\pi (D/\lambda_{RF}) \times 5.685 \times 10^{-14} \times 10^{S/20}$$

A radar frequency of 915 MHz, which was previously selected for the preferred embodiments, corresponds to a wavelength in air of 0.3279 meters. For $D = 150$ meters and $\lambda_{RF} = 0.3279$ meters:

$$\Gamma_B = 1.155 \times 10^{-10} \times 10^{S/20}$$

$$|\Gamma_B|^2 = 1.335 \times 10^{(S-200)/10}$$

From page 26 and 27 of "Measuring The Annoyance of Aircraft Noise" (AFIT/NR 87-71T) the noise generated by a jet during takeoff at a points 1.0 km in front of and behind the aircraft results in a sound pressure level in the band 1200–2400 Hz of 115 dB. It will be shown subsequently that the "Bragg" doppler bandwidth is equal to v/D where v is sound velocity and D is range bin size. For a 150 meter range bin the "Bragg" doppler bandwidth is 2.2 Hz. Assuming conservatively that a landing aircraft generates 10 dB less noise, the sound pressure level in a doppler bandwidth of 2.2 Hz is 77.6 dB. In this case, $$|\Gamma_B|^2 = 7.682 \times 10^{-13}$$

For a transmit beamwidth of 8° azimuth and 4° elevation, the fraction of radar signal power intercepted by a pair of vortices, each 1 meter in diameter, at range $R_0$ (1000 meters) is given by $1.612 \times 10^{-4}$. In this case the energy backscattered $E_{REFL}$ towards the radar antenna for a 1 microsecond pulse (150 meter range bin) and transmitter peak power $P_T$, is given by:

$$E_{REFL} = P_T \times 1.238 \times 10^{-22} \text{ joules}$$

By duality, the fraction of signal energy intercepted by the monopulse antenna sum beam with 8° azimuth and 4° elevation beamwidths is also given by $1.612 \times 10^{-4}$. Hence the the energy E intercepted by the monopulse sum beam is;

$$E = P_T \times 1.996 \times 10^{-26}$$

The S/N out of a matched filter for a single pulse is $(2E/N_0)$. Therefore, the signal at the output of the matched filter is:

$$S/N = P_T \times 1.996 \times 10^{-5}$$

Coherent integration significantly increases the above single pulse S/N. Hence the calculation of peak transmitted power is deferred until this quantity is established.

Figure 5B:
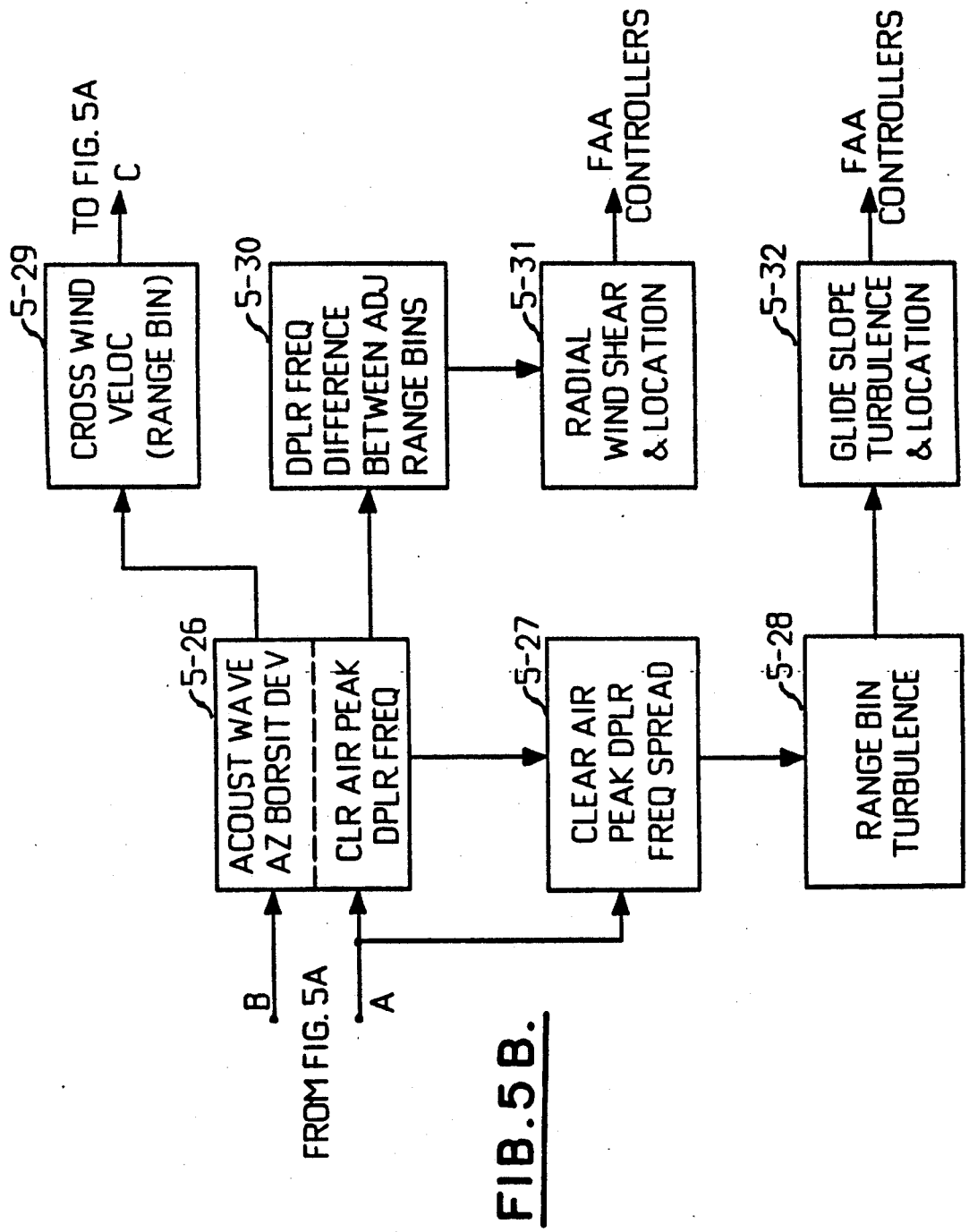

Refer now to FIGS. 5A and 5B, wherein elements previously discussed bear the originally assigned reference numerals. A radar signal is generated by transmitter 5-5 and radiated by antenna 5-2, which with receiving antennas 5-1 and 5-3 comprise the monopulse antenna 4-9 shown in FIG. 4. This signal may be a pulse of one microsecond in duration at a pulse repetition rate (PRF) of 2048 Hz. Radar echoes are received by antennas 5-1 and 5-3 which are coupled in an azimuth monopulse configuration. In this mode the azimuth beamwidth of each antenna is 8°.

Echoes received by antennas 5-1 and 5-3 are coupled to coherent receivers 5-4 and 5-6, respectively, wherein received pulses in each range bin are coherently detected and summed. The number of pulses summed is yet to be discussed. Sequentially received sum samples from receivers 5-4 and 5-6 are respectively coupled to doppler spectrum processors 5-8 and 5-10 wherein the doppler spectrum of each summed sampled sequence is determined. Signals representative of the doppler spectra are coupled from doppler processors 5-8 and 5-10 to a normalized difference beam doppler spectrum processor 5-9, wherein the monopulse difference beam doppler spectral amplitude is divided by the monopulse sum beam doppler spectral amplitude, doppler bin by doppler bin, in each range bin.

The sum beam doppler spectrum provided by the doppler spectrum processor 5-8 is coupled to a doppler detection threshold circuit 5-14 which provides a switching signal to surveillance switch 5-13 when a doppler frequency corresponding to the velocity of a landing aircraft is detected in the sum beam doppler spectrum of a range bin 2.5 km from the radar. Landing velocities are typically between 60 and 100 m/s (120–200 knots). After turn-on, surveillance switch 5-13 provides an enable signal to a surveillance gate 5-12 which is coupled to the sum beam doppler spectrum processor 5-8 and normalized monopulse difference beam doppler spectrum processor 5-9 to receive the corresponding doppler spectra for each range bin. Additionally, surveillance switch 5-13, when turned-on provides PRF switching signals to the transmitter 5-5 which causes the PRF to increase from 2048 to 40,000 Hz and provides switching signals to receivers 5-4 and 5-6, normalized monopulse difference beam doppler spectrum processor 5-9, and doppler spectrum processors 5-8 and 5-10 to switch these units into the high PRF operating mode.

The high PRF transmission is used to detect wind shear, turbulence, cross wind velocity and vortices as well as to maintain track on the aircraft in the glide slope. Since the aircraft is the source of "Bragg" acoustic excitation, "Bragg" returns are not processed in the same range bin as the aircraft. The aircraft range bin changes as the aircraft advances through the glide slope. As stated previously, the range bin receiving the aircraft echo contains one doppler peak. Thus, as the aircraft traverses the glide slope, this peak doppler moves trough the range bins along the aircraft path. Aircraft position tracker 5-22 tracks the range bins of the peak doppler, thereby providing aircraft position, and signals the radar range of the aircraft to receivers 5-4 and 5-6, doppler spectrum processors 5-8 and 5-10, and doppler difference beam doppler spectrum normalization processor 5-9 so that signal processing of aircraft echoes is performed by these units in the range bin of the aircraft position. Additionally, the aircraft position provided by the aircraft position tracker 5-22 to the doppler processing units marks the range bins in front of and behind the aircraft. Finally, aircraft position tracker 5-22 signals the transmitter 5-5 to return to the low PRF mode when the aircraft has landed.

Backscatter from range bins in front of an incoming aircraft are processed to provide (a) estimates of wind shear, turbulence, and cross wind velocity and (b) location, strength and decay rate of vortices from aircraft which have already landed. Range bins behind the aircraft are searched only for vortices generated by the aircraft presently in the glide slope. Surrounding air temperature is measured simultaneously as a reference for vortex strength and decay rate.

The doppler spectrum from the doppler spectrum processor 5-8 and the normalized monopulse difference beam doppler spectrum from the normalized monopulse difference beam doppler spectrum processor 5-9 are coupled via the surveillance gate 5-12 to an aircraft frequency and phase determiner 5-18 wherein the peak doppler spectrum frequency and monopulse phase corresponding to the peak doppler spectrum signal for the aircraft in the glide slope are respectively extracted. This frequency and phase is then coupled to the aircraft position tracker 5-22 wherein aircraft velocity in the range bin is estimated from the peak doppler frequency and its azimuth (when the monopulse system is in the azimuth configuration) or elevation position (when the monopulse system is in the elevation configuration) in the range bin is estimated from the phase of the monopulse signal.

When the aircraft is 1 km from the radar, aircraft position tracker 5-22 triggers a beamwidth switch 5-7 to switch azimuth beamwidth from 8° to 16°. This results in a 3 db reduction in S/N for vortices in front of and behind the aircraft. Once the aircraft's range is less than 175 meters from the radar, the radar range circuitry is decoupled from the aircraft position tracker 5-22 and aircraft range is estimated from its prior extracted peak doppler frequency. About 10 seconds after the aircraft passes over the threshold, glide slope surveillance is terminated by aircraft position tracker 5-22 in the closest range bin to the radar.

Vortex temperature and position continue to be monitored in the remaining range bins for periods which differ for each range bin due to acoustic propagation delay. This permits a longer vortex temperature history to be accumulated in order to project when newly generated vortices will become non-hazardous for following aircraft. When "Bragg" backscatter detection ceases in the range bin at 2 km, the aircraft position tracker 5-22 generates a trigger to the processing circuits that reestablishes the 2048 Hz PRF and a trigger to the 3 monopulse antennas that returns the azimuth beamwidth to 8°. Position tracker 5-22 also triggers surveillance switch 5-13 to open surveillance gate 5-12.

Since vortices form directly behind an aircraft, aircraft position tracker 5-22 couples aircraft position to a vortex lateral movement processor 5-21 which estimates the lateral movement rate and direction of vortices behind the aircraft using tracked aircraft position in each range bin.

Those skilled in the art should recognize that the peak doppler frequencies in the doppler spectrum generated by the doppler spectrum processor 5-8 are the "Bragg" backscatter frequencies. The Bragg sound wavelength $\lambda_B$ for maximum reflection is related to the radar wavelength $\lambda_{RF}$ by:

$$\lambda_B = (\tfrac{1}{2})\lambda_{RF}$$

If the acoustic velocity is denoted by v, frequency by f and the speed of light by c, $$\lambda_B = v/f_B \quad \text{and} \quad \lambda_{RF} = c/f_{RF}$$
$$\text{Since} \quad v/f_B = (c/2)f_{RF}$$
$$\text{then} \quad f_B = (2v/c)f_{RF}$$

This is also the expression for the echo doppler shift from a reflecting object moving at radial velocity v with respect to the radar. Hence, the peak signal doppler frequency for "Bragg" backscatter and the "Bragg" frequency are the same:

$$f_D = f_B = (2v/c)f_{RF}$$

As previously discussed, range bins containing vortices, exhibit two amplitude peaks in the sum beam doppler spectrum generated by doppler spectrum processor 5-8. The frequency of the larger amplitude doppler peak is due to clear air "Bragg" backscatter in each range bin. The doppler spectrum from the doppler spectrum processor 5-8 is coupled to a clear air peak doppler processor 5-11, via the surveillance gate 5-12, wherein the "Bragg" frequency of the larger amplitude doppler peak is estimated.

The sum beam doppler spectrum from the doppler spectrum processor 5-8 and the normalized monopulse difference beam doppler spectrum from the difference beam doppler spectrum processor are also coupled via surveillance gate 5-12 to a vortex peak processor 5-16 wherein the frequency and the elevation monopulse deviation from antenna boresight of the smaller amplitude doppler signal is estimated. This smaller peak amplitude doppler signal corresponds to the vortex "Bragg" frequency and the elevation monopulse deviation from antenna boresight corresponds to the vortex pair position in elevation in each range bin. When the smaller amplitude peak exceeds a threshold provided by a vortex detection threshold generator 5-17, the vortex elevation position is coupled from the vortex peak processor 5-16 to a vortex location processor 5-20 which estimates vortex position in the glide path in each range bin. The doppler frequency for clear air "Bragg" return and the doppler frequency for vortex "Bragg" return are respectively coupled from the air peak processor 5-11 and the vortex peak processor 5-16 to a difference circuit 5-15 which provides the doppler difference between the air "Bragg" doppler frequency and the vortex "Bragg" doppler frequency. This difference frequency is a measure of the temperature difference between vortices and surrounding air in each range bin and therefore a measure of vortex residual strength. A signal representative of the difference frequency is coupled from the difference circuit 5-15 to a vortex strength computer 5-19 wherein the vortex strength is estimated in each range bin. The relationship between the difference frequency and vortex strength may vary with the type of aircraft generating the vortices and requires experimental determination.

A signal representative of the vortex strength is coupled from the vortex strength computer 5-19 to a vortex decay tracker 5-23 which detects changes in vortex strength and provides an estimate of the vortex decay rate, in each range bin, as a function of time. Though not shown in FIG. 5A, a complementary estimate of vortex decay rate may be obtained from a determination of vortex temperature decay as a function of range along the glide slope.

The signals representative of vortex strength, vortex decay rate, vortex location, vortex lateral movement rate and direction, and cross wind velocity, yet to be discussed, are coupled to a vortex hazard assessor 5-24 wherein a vortex hazard assessment within the glide slope is performed. Vortex hazard assessor 5-24 computes how long it will take for vortices to decay to a point where they are not hazardous to the following aircraft and how long it will take a crosswind to blow potentially hazardous vortices out of the glide slope. A signal representative of the vortex hazard assessment is coupled to an aircraft spacing processor 5-25 which utilizes the hazard assessment to provide spacing recommendations between landing aircraft to FAA aircraft controllers.

The accuracy with which vortex strength and decay rate can be estimated depends on the resolution with which the radar can measure temperature. To establish the temperature resolution it is first necessary to determine the "natural" doppler spectral width of "Bragg" backscatter.

Let $\lambda_a$ correspond to the optimum "Bragg" wavelength. If radar range bin width is denoted by D, then $M = D/\lambda_a$ is the number of Bragg wavelengths encompassed by the radar range bin. Increasing the number of acoustic wavelengths by one in the range bin produces a "Bragg" echo null. It is equivalent to distributing 360 degrees of doppler phase shift over the range bin and summing. Let $\lambda_b$ correspond to the Bragg wavelength which results in a null. Then $$M\lambda_a = D = (M+1)\lambda_b$$

From the above it may be readily verified that the difference $\Delta f$ between the null frequency $f_b$ and the optimum "Bragg" frequency $f_a$ is $$f_b - f_a = \Delta f = v/D$$

Thus the "natural" doppler spectral width of a "Bragg" echo is a function only of sound velocity v and range bin width D and is independent of the "Bragg" frequency and the radar carrier frequency. This width defines the separation between the peak "Bragg" doppler frequency and the first spectral null. It is also approximately equal to the 3db Bragg spectral width.

From the above expression the "Bragg" spectral width for a range bin 150 meters wide is 2.2 Hz. Based on this "Bragg" doppler spectral width, optimum detection and estimation performance will be realized when the coherent observation interval for "Bragg" backscatter is around 0.45 seconds.

With the determination of "Bragg" spectral width, the radar's ability to resolve temperature differences is calculated as follows. It is well known that the velocity of sound in air as a function of absolute temperature is given by $$v = 20.06 \, (T)^{\frac{1}{2}}$$

from which it follows that $$T = v^2/402.4$$

For two different temperatures $$T_1 - T_2 = (v_1^2 - v_2^2)/402.4$$
$$= (v_1 - v_2)(v_1 + v_2)/402.4$$

Since $(v_1 + v_2)$ is closely equal to $2 \times 331$ m/s, $$\Delta T = T_1 - T_2 = 1.645 \Delta v$$

Doppler resolution $\Delta f$ is related to $\Delta v$ by the conventional doppler relation with $f_{RF}$ equal to 915 MHz and $$\Delta f = 2(\Delta v/c)f_{RF} = 6.33 \Delta v$$

Substituting for $\Delta v$, $$\Delta T = 1.645 \Delta f / 6.33 = 0.26 \Delta f$$

Inserting $\Delta f = 2.2$ Hz results in a temperature resolution $\Delta T$ of 0.57° K. This temperature resolution is acceptable for measuring vortex strength and decay rate.

As stated previously, to determine required transmitter power level it is necessary to ascertain the amount of coherent integration performed on received "Bragg" signals. The doppler spectra computed in the doppler spectrum processors 5-8 and 5-10 must encompass both positive and negative doppler shifted "Bragg" echoes, positive doppler shift for range bins in front of the aircraft and negative doppler shift for range bins behind the aircraft. Assuming a maximum temperature ambient in the glide slope of 30° C. and a maximum temperature rise in vortices of 20° C. with respect to surrounding air, it may readily be shown that the maximum (positive or negative) expected "Bragg" doppler frequency is 2197 Hz. Hence the total doppler band to be covered is 4394 Hz. For optimum performance, "Bragg" backscatter should be coherently processed by a Fast Fourier Transform (FFT) with 2.2 Hz doppler resolution. A 2048 point FFT in the doppler spectrum processors 5-8 and 5-10 having 2.2 Hz bins encompassing a doppler bandwidth of 4506 Hz, satisfies the doppler band coverage requirement.

Nine (9) received pulses may be coherently summed by the receivers 5-4 and 5-6 for each range bin prior to computing a 2048 point FFT in doppler spectrum processors 5-8 and 5-10. Hence, the total number of pulses coherently integrated is $(9 \times 2048)$ or 18,432 pulses. This corresponds to a coherent integration period of 0.46 seconds which is very close to optimum. We now return to the calculation of vortex $(S/N)_0$. After 18,432 pulses have been coherently integrated, $(S/N)_0$ is given by:

$$(S/N)_o = P_T \times 1.996 \times 10^{-5} \times 1.843 \times 10^4$$
$$= P_T \times 3.679 \times 10^{-1}$$

Assuming 8 db of radar losses, and a peak power of 2000 watts, $(S/N)_0$ is 20.7 db. As previously noted, vortex temperature measurement accuracy can be improved by non-coherently integrating several successive estimates. The average transmitted power is 80 watts for high PRF operation and 4 watts for low PRF operation.

The monopulse receive antenna is switched between elevation and azimuth monopulse configurations every 0.46 seconds. The sum beam doppler spectrum for either the elevation or azimuth monopulse configuration contains an estimate of vortex "Bragg" frequency.

Hence, the ability to average several successive vortex temperature estimates is not affected.

Now consider sensor performance for detecting and locating vortices behind an incoming aircraft. Sensor performance for this case can also be referenced to $(S/N)_0$. Table 3 shows the change in S/N for vortices located at 2 km range and the aircraft 1.5 km from the radar, relative to vortex $(S/N)_0$.

TABLE 3

| RANGE R | RADAR S/N GAIN/LOSS | ACOUSTIC LEVEL GAIN/LOSS | COMBINED S/N GAIN/LOSS |
|---|---|---|---|
| 2000 m | −12 db | +9.6 db | −2.4 db |

It follows from Table 3 and the computed value of $(S/N)_0$ that vortex S/N is 18.3 db in this case. Thus vortex detectability behind the aircraft is comparable to sensor performance in front of the aircraft.

It should be noted that newly formed vortices complete the coil up process about 10 to 20 wingspans behind the aircraft generating the vortices. For large aircraft this is of the order of 500 meters which corresponds to the range bin shown in Table 3.

Referring now to FIG. 5B with continued reference to FIG. 5A. When an approaching aircraft is detected at 2.5 km by the detection threshold circuit 5-14, surveillance switch 5-13 couples an enable signal to surveillance gate 5-12, as previously described.

Gate 5-12, when enabled, couples the sum beam doppler spectrum and the normalized monopulse difference beam doppler spectrum to the vortex detector 5-16 to commence vortex detection and location as previously described, and to air peak doppler frequency 5-26 and air peak doppler spread determinator 5-27 to commence measurement of the surrounding clear air "Bragg" backscatter.

Air peak doppler frequency processor 5-26 identifies the doppler frequency having the largest amplitude within the expected range of "Bragg" backscatter frequencies for the surrounding clear air. The azimuth monopulse deviation from boresight for this doppler frequency is a measure of the cross range shift of the acoustic wave excitation. Clear air backscatter is typically 50 db larger than vortex return and hence easily detectable. The identified clear air doppler frequency is directly related to the radial velocity of acoustic waves emanating from the aircraft. Radial acoustic velocity is the algebraic sum of (a) the speed of sound in still air and (b) the radial component of horizontal wind velocity. The Doppler frequencies identified in the air peak doppler frequency processor 5-26 are coupled to a doppler frequency difference determinator 5-30 which determines the difference of clear air doppler frequencies in adjacent range bins. This range doppler frequency difference is coupled to wind shear detector 5-31 which generates a radial wind shear map for all ranges between the aircraft and the radar.

The doppler spectrum provided by the doppler spectrum processor 5-8 coupled through the gate 5-12 and surrounding clear air doppler frequency from the air peak doppler frequency processor 5-26 are also coupled to an air peak doppler frequency spread determinator 5-27 which establishes the 3 db spectral width around the peak doppler in each range bin. A signal representative of the spectral width is coupled to a range bin turbulence converter 5-28 wherein the spectral width is converted to an estimate of turbulence in each range bin. The minimum spectral width is 2.2 Hz when no turbulence is present. Table 4, which may be stored in the converter 5-28, shows expected doppler width for several values of turbulence. Note that a doppler resolution of 2.2 Hz corresponds to a velocity resolution of 0.36 meters per second. The turbulence estimated for each range bin is provided to a glide slope turbulence and location determinator 5-32, wherein a glide slope turbulence map is established and wherefrom glide slope turbulence and location are provided.

TABLE 4

| TURBULENCE | SPECTRAL WIDTH |
|---|---|
| 1 m/s | 6.48 Hz |
| 2 | 12.40 |
| 3 | 18.43 |

Refer again to FIG. 4. The region in which the approaching acoustic wavefront 4-7 and the radar wavefront 4-8 are separated by a distance S that is less than ¼ wavelength at 915 MHz defines a backscattering area from which the radar reflection is essentially coherent. Halfway between the radar and the aircraft, the reflected signal will be similar to that from a flat plate of area A, due to the cancelling effects of the equal and opposite wavefront curvatures. This reflection area has a diameter of approximately 18 meters when the acoustic wave originates from an aircraft 2 km from the radar. Area A resulting from an acoustic wave emanating from an aircraft at a particular range from the radar antenna is substantially equal in the range bins between the aircraft and the radar antenna, since one wavefront curvature decreases as the other increases.

As the aircraft approaches the radar antenna, area A decreases, the decreased area being substantially equal in range bins contained in the shorter range between the aircraft and the radar antenna. The center of the areas A, however, for an aircraft on an essentially constant azimuth course with respect to radar antenna boresight, does not change in a particular range bin from the radar antenna as the aircraft range to the radar antenna decreases, unless a cross wind is present. A cross wind will shift area A in a cross range direction and change the angle of arrival of clear air "Bragg" backscatter from area A. Small changes in azimuth of an aircraft during its approach will tend to average out with respect to the measurement of cross wind shifts of area A. Aircraft azimuth changes can also be compensated for since the aircraft is tracked continuously while in the glide slope.

Successive changes in area A backscatter deviation from boresight as a function of time in each range bin permits cross wind velocity to be computed. This is accomplished by coupling acoustic wave azimuth deviation from boresight provided by clear air peak doppler frequency processor 5-26 to cross wind velocity determinator 5-29. The cross wind velocity established by the cross wind velocity determinator 5-29 is coupled to the vortex hazard determinator 5-24 as part of the overall assessment of the vortex hazard in each range bin.

If greater cross wind velocity measurement accuracy is desirable, two bistatic antennas 4-10a and 4-10b (FIG. 4), symmetrically displaced several RF wavelengths on either side of the monopulse antenna 4-9, can be added to the antenna configuration previously described These two antennas may provide interferometric measurement of the angle of arrival of clear air backscatter from coherent area A on the acoustic wavefront, providing significantly greater accuracy.

A two element interferometer antenna typically has multiple grating lobes whose number depends on the separation between the two antenna apertures. Grating lobes generate angle measurement ambiguity. In this application the number of grating lobes is restricted to those which fall within the radar beam. Further, angle ambiguity may be eliminated by utilizing the monopulse antenna azimuth measurement capability to determine which interferometer lobe is receiving the clear air "Bragg" backscatter.

Sensor performance for surrounding clear air measurements can be estimated as follows. The ratio of the S/N of clear air return, from a range bin 1 km from the radar when the aircraft is 2 km away, relative to vortex $(S/N)_0$ can be evaluated fairly simply. Those skilled in the art should recognize that this is equal to the ratio of the square of their respective coherent reflecting areas, which in this case is $(18/1)^4$ or $1 \times 10^5$. Hence received clear air return is 50 db greater than vortex return at practically all ranges in front of the aircraft.

For range bins behind the aircraft, the temperature of surrounding air serves as a reference for calculating vortex strength. For this case the curvature of the radar and acoustic wavefronts bend in the same direction. Those skilled in the art should recognize that the ratio of clear air return to vortex return is simply the square of the radar illuminated clear air area to illuminated vortex area. In a range bin 1 km from the radar this is equal to $[1/(1.612 \times 10^{-4})]^2$ or $3.8 \times 10^7$. It may be concluded that clear air return is at least 50 db greater than vortex return in range bins behind the aircraft.

Refer again to FIG. 5A. The sensor operates at a low PRF of 2048 Hz until an aircraft is detected by the detection threshold 5-14 to be in a range bin 2.5 km from the radar. In the low PRF mode, pulses amplified by receiver 5-4 are integrated in a 512 point FFT in the doppler spectrum processor 5-8. The FFT frequency resolution for this processing is 4 Hz which corresponds to a velocity resolution of 0.7 meters per second (m/s). During a 0.25 second coherent integration period the aircraft moves approximately 20 meters.

When the detection threshold 5-14 detects an echo with a radial velocity between 60-120 m/s in the designated range bin and whose amplitude exceeds a pre-set threshold, the detection threshold 5-14 triggers the surveillance switch 5-13 which shifts the sensor into the high PRF mode of operation in which pulses are emitted at a rate of 40,000 Hz. Aircraft returns are integrated by a 2048 FFT in doppler spectrum processor 5-8 in the high PRF mode similar to that for vortex returns. However, there is no pre-FFT summing of pulses in receiver 5-4 as there is for range bins containing vortices.

Signal processing peculiar to the range bin containing aircraft return is accomplished by coupling the tracked aircraft range bin of the aircraft position tracker 5-22 to the receiver 5-4 and the doppler spectrum processor 5-8. High PRF mode velocity resolution is 2.15 m/s and the aircraft moves about 4 meters during a coherent integration period.

Prior to detection 18,432 vortex returns are coherently integrated. The "integrated cross section" of a vortex may be defined as the vortex physical cross section times the magnitude squared of the "Bragg" reflection coefficient times the number of returns coherently integrated. The "integrated cross section" for 2 vortices may readily be determined to be $2.2 \times 10^{-8}$ square meters (m²). Aircraft cross sections are typically in the range of 1-100 square meters. The "integrated cross section" of an aircraft can be calculated in a manner similar to that for vortices. The "integrated aircraft cross section" for a 1 square meter aircraft is 2048 m².

The ratio of aircraft "integrated cross section" to vortex "integrated cross section" yields the increase in output S/N for aircraft returns compared to vortex returns that $9.3 \times 10^{10}$ Thus the coherently integrated aircraft echo amplitude is about 110 db larger than coherently integrated vortex returns in the high PRF mode. A similar calculation for the low PRF mode indicates an improvement of $2.3 \times 10^{10}$. This indicates that aircraft return is also easily detected in the low PRF mode.

While aircraft generated acoustic noise is an excellent source of "Bragg" excitation of the glide slope, the meteorological performance of the preferred embodiments may be enhanced by the addition of an acoustic radiator 4-11 (FIG. 4) colocated with the radar antenna that excites the glide slope in the absence of landing aircraft. A second advantage of adding an auxiliary acoustic radiator is to extend the time for measuring the decay rate of vortices generated by an aircraft which has just landed and ceased emitting acoustic noise. For this purpose, it is sufficient to monitor vortices in the range bins closest to the radar and thereby minimize the auxiliary acoustic radiator power level.

The preferred embodiments utilize an auxiliary acoustic radiator with a 20 degree azimuth beamwidth and a 20 degree elevation beamwidth. The sensor operates in the high PRF mode. The minimum acceptable output S/N in a range bin 550 meters away is once again defined as equal to $(S/N)_0$. The aircraft acoustic excitation level for $(S/N)_0$ was previously shown to be 77.6 db in a 2.2 Hz bandwidth. Assuming the same excitation level, the output S/N for vortices in a range bin 1 km from the radar is 17.8 db larger. This is due to a radar reduced range increase of 10.4 db and 7.4 db less acoustic attenuation due to the proximity of the acoustic radiator. If the acoustic excitation level is reduced by 17.8 db to 59.8 db, the vortex S/N in the range bin at 550 meters is equal to $(S/N)_0$. It was previously shown that the 0 db reference for sound pressure level is $10^{-16}$ watts/cm2 or $10^{-12}$ watts/m2. Hence an acoustic level of 59.8 db is equivalent to $9.55 \times 10^{-7}$ watts/m2.

An acoustic radiator having a 20° by 20° beamwidth projects a cross section area 550 meters away of approximately $3.69 \times 10^4$ square meters. Assuming a potential variation of 30° C. in clear air temperature and a possible 20° C. rise in vortex temperature, the radiated acoustic excitation must encompass a "Bragg" bandwidth of 193 Hz. Hence, the total radiated acoustic power to provide a S/N of 20.7 db for vortices 550 meters away over a "Bragg" bandwidth of 193 Hz is 3.1 watts.

Because the radar and the acoustic source are colocated, clear air "Bragg" backscatter from all ranges is focussed onto a spot on the monopulse antenna. The clear air return is $3.8 \times 10^7$ larger than vortex return, since this is analogous to the case treated previously where the radar and acoustic wave curvature are in the same direction. A cross wind can "blow" the spot off the monopulse antenna, resulting in a 20-30 db reduction in the clear air signal received by the monopulse antenna. This reduced amplitude, which is characteristic of reflected clear air sidelobe levels, is still 40 db or more greater than vortex return and therefore easily detected. It follows that for an acoustic attenuation of 16 db/km clear air returns are detectable out to 2.5 km.

This can be summarized as follows. Clear air backscatter can be processed to measure radial wind shear and turbulence (but not cross wind velocity) using an acoustic radiator colocated with the radar monopulse antenna, that radiates approximately 3 watts of acoustic power to acoustically excite the glide slope. The output S/N for clear air returns will exceed $(S/N)_0$ up to the maximum instrumented range of 2.5 km, for range bins in which the acoustic wave has not been blown completely out of the radar beam.

The FAA vortex warning system 5-25 in FIG. 5A requires a vortex sensor to detect the vortices generated by each landing aircraft and track their transport in the critical approach region. This system was studied by the FAA several years ago, but was never implemented because the required sensor heretofore did exist.

The information coupled to FAA vortex warning system 5-25 by vortex hazard determinator 5-24 is sufficient to enable its operation as originally proposed. Vortex position is displayed to the following aircraft via lights installed at the landing runway threshold. Red and green lights provide the approaching pilot with the approach corridor vortex status information. A green light indicates that the approach corridor is free of the vortices generated by the preceding aircraft. Red light patterns provide the pilot with lead-time information.

A "rippling" red light indicates a vortex is expected to persist in the corridor for more than 60 seconds. The number of lights indicate vortex strength. The information conveyed by the colored light patterns is sufficient to allow the pilot to make a timely decision on whether to proceed with the approach or to initiate a go-around.

Tests were run by the FAA to determine the feasibility of using lights as a means to communicate to the pilot the corridor vortex status. Bright light, adverse weather, and night conditions were simulated using an instrumented runway model to test the detectability of the vortex lights amid the normal approach light pattern.

Under all conditions using standard airport lights, the patterns were detected by the test subjects and the correct meaning identified. Most important, the light pattern was always detected in time before an altitude of 100 meters was reached, the critical height for the initiation of a go-around. The displayed light pattern is also repeated on the controller's console so that when conditions conducive to long vortex persistence in the corridor are observed, the traffic flow may be adjusted to minimize the need for a go-around.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. A surveillance sensor for monitoring and detecting aerodynamic conditions in a vicinity of an aircraft landing glide slope comprising:
   means for transmitting a radar signal;
   monopulse means for receiving backscatter of said radar signal in range bins of predetermined length through a sum beam and a difference beam;
   doppler spectrum means coupled to said sum and difference beams for providing a sum beam doppler spectrum and a difference beam doppler spectrum;
   processor means coupled to said doppler spectrum means for processing said sum and difference beam doppler spectra and for providing signals representative of aerodynamic conditions; and
   means responsive to said signals representative of aerodynamic conditions for assessing said aerodynamic conditions and for providing hazardous condition warning signals when hazardous aerodynamic conditions are detected.

2. A surveillance sensor in accordance with claim 1 wherein said processor means includes:
   means for normalizing said difference beam doppler spectrum to said sum beam doppler spectrum to establish a normalized difference beam doppler spectrum; and
   means responsive to said normalized difference beam doppler spectrum for providing a signal representative of an aircraft generated vortex elevation angle.

3. A surveillance sensor in accordance with claim 2 wherein said processor means further includes:
   velocity means responsive to said normalized difference beam doppler spectrum for providing a signal representative of vortex cross wind velocity; and
   location means responsive to said cross wind velocity representative signal and said elevation angle representative signal for providing a signal representative of vortex location.

4. A surveillance sensor in accordance with claim 3 wherein said velocity means includes:
   means responsive to said difference beam doppler spectrum for providing a signal representative of acoustic wave azimuth deviation angle from said glide slope in each range bin;
   means responsive to signals representative of azimuth deviation angles in azimuthally adjacent range bins for providing a signal representative of said cross wind velocity.

5. A surveillance sensor in accordance with claim 3 wherein said processor means further includes means coupled to said location means for providing a signals representative of vortex lateral movement rate and direction.

6. A surveillance sensor in accordance with claim 1 wherein said processor means includes vortex strength means responsive to said sum beam doppler doppler spectrum for providing a signal representative of vortex strength.

7. A surveillance sensor in accordance with claim 1 wherein said vortex strength means includes:
   backscatter means responsive to said sum beam doppler spectrum for providing signals representative of clear air and vortex backscatter; and
   strength means responsive to said clear air and said vortex backscatter signals for providing a signal representative of vortex strength.

8. A surveillance sensor in accordance with claim 7 wherein said processor means further includes means coupled to said strength means for time monitoring said signal representative of vortex strength and determining said vortex strength decay rate.

9. A surveillance sensor in accordance with claim 8 further including acoustic noise means for radiating acoustic noise along said glide slope such that vortex acoustic signals are enhanced and time for determining said vortex decay rate is extended.

10. A surveillance sensor in accordance with claim 7 wherein said processor means further includes means responsive to said clear air backscatter representative signal for providing signals representative of strength and location of radial wind shear.

11. A surveillance sensor in accordance with claim 7 wherein said processor means further includes means responsive to said clear air backscatter representative signal for providing signals representative of strength and location of air turbulence.

12. A surveillance sensor in according with claim 11 wherein said tracker means includes:
angle means responsive to said sum beam spectrum for providing signals representative of azimuth and elevation angles of said aircraft in each range bin;
peak means for providing a signal representative of peak amplitude of said sum doppler spectrum in each range bin, said peak amplitude being representative of backscatter from said aircraft; and
position means coupled to said angle and peak means for tracking said aircraft range bin position and azimuth and elevation angles in said range bin position.

13. A surveillance sensor in accordance with claim 12 wherein said position means includes means for providing a trigger when said aircraft is in a predetermined range bin and wherein said monopulse means includes monopulse antenna means for providing said sum and difference beams, said monopulse means including means for providing a beamwidth switchable between first and second beamwidths in response to said trigger coupled from said position means.

14. A surveillance sensor in accordance with claim 12 wherein said position means includes means for providing a trigger when said aircraft is in a predetermined range bin and wherein said transmitting means and said monopulse means include means responsive to said trigger for providing a pulse repetition rate (PRR) switchable between a first PRR and a second PRR.

15. A surveillance sensor in accordance with claim 1 wherein said processor means includes tracker means responsive to said sum beam doppler spectrum for tracking position of aircraft along said glide slope.

16. A surveillance sensor in accordance with claim 1 wherein said monopulse means includes a first monopulse antenna providing unambiguous azimuth information with a first accuracy and a second monopulse antenna providing ambiguous information with a second accuracy, said first and second monopulse antennas providing, in combination, unambiguous azimuth information with said second accuracy.

17. A surveillance sensor in accordance with claim 1 further including acoustic noise means for radiating acoustic noise along said glide slope to provide acoustic induced atmospheric radar signal reflecting regions wherefrom signals received by said monopulse means are utilized to determine wind velocity across said glide slope.

* * * * *